United States Patent
Cha et al.

(10) Patent No.: US 9,527,535 B1
(45) Date of Patent: Dec. 27, 2016

(54) VARIABLE SPOILER DEVICE FOR REAR BUMPER OF VEHICLE

(71) Applicant: Hyundai Motor Company, Seoul (KR)

(72) Inventors: Dong Eun Cha, Suwon-si (KR); Hyun Gyung Kim, Hwaseong-si (KR); Keon Soo Jin, Ulsan (KR); Jin Young Yoon, Gimpo-si (KR); Ki Hong Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/941,570

(22) Filed: Nov. 14, 2015

(30) Foreign Application Priority Data

Sep. 11, 2015 (KR) .................. 10-2015-0129045

(51) Int. Cl.
*B62D 35/02* (2006.01)
*B60R 19/48* (2006.01)
*B62D 35/00* (2006.01)

(52) U.S. Cl.
CPC ............. *B62D 35/007* (2013.01); *B60R 19/48* (2013.01); *B62D 35/02* (2013.01)

(58) Field of Classification Search
CPC ........ B62D 35/02; B62D 35/007; B62D 37/02
USPC ...... 296/180.1–180.5; 180/903; 105/1.1, 1.2; 293/117
See application file for complete search history.

(56) References Cited

U.S. PATENT DOCUMENTS

| | | | | |
|---|---|---|---|---|
| 5,165,751 | A | * 11/1992 | Matsumoto | B62D 35/007 296/180.5 |
| 7,481,482 | B2 | 1/2009 | Grave | |
| 7,717,494 | B2 | * 5/2010 | Nagahama | B62D 37/02 296/180.1 |
| 7,841,646 | B2 | * 11/2010 | Paul | B62D 37/02 296/180.1 |
| 2004/0256885 | A1 | 12/2004 | Bui | |

FOREIGN PATENT DOCUMENTS

| | | | |
|---|---|---|---|
| DE | 102011103787 | * | 12/2012 |
| DE | 102013101296 | * | 8/2014 |
| JP | 2006-219074 A | | 8/2006 |
| KR | 10-1363078 B1 | | 2/2014 |
| KR | 10-2015-0072715 A | | 6/2015 |
| KR | 10-1526735 B1 | | 6/2015 |

* cited by examiner

Primary Examiner — Dennis H Pedder
(74) Attorney, Agent, or Firm — Morgan, Lewis & Bockius LLP

(57) ABSTRACT

A variable spoiler device may include a spoiler panel, which closely contacts a rear bumper in a retracted state, to perform a rear bumper function, and protrudes downwards from the rear bumper in a protruded state, to perform a spoiler function. Link mechanisms, which enable retraction and protrusion operations of the spoiler panel, continuously secure support force withstanding wind pressure in a protruded state of the spoiler panel.

11 Claims, 8 Drawing Sheets

VARIABLE SPOILER DEVICE FOR REAR BUMPER OF VEHICLE

CROSS-REFERENCE TO RELATED APPLICATION

The present application claims the priority benefit of Korean Patent Application No. 10-2015-0129045, filed Sep. 11, 2015, the disclosure of which is incorporated herein by reference.

BACKGROUND OF THE INVENTION

Field of the Invention

The present invention relates to a variable spoiler device for a rear bumper of a vehicle, and more particularly to a variable spoiler device for a rear bumper of a vehicle, the protrusion length of which is actively varied in accordance with travel speed of the vehicle.

Description of Related Art

Vehicles have increased lift with increased travel speed thereof. In this case, contact force of the tires on the ground decreases and, as such, stability in traveling is deteriorated. In addition, there is a limitation in increasing travel speed.

In order to prevent such problems, an attachment for pressing the vehicle body down is needed. One example of such an attachment is a spoiler, which is also called an air spoiler because it generally functions to change flow of air.

Examples of such a spoiler include a nose spoiler mounted at the front end of a vehicle, a roof spoiler mounted on the roof of a vehicle, and a tail spoiler mounted at the rear end of a vehicle. FIG. 1 shows the configuration of a fixed rear spoiler 3 mounted under a rear bumper face 1 by a bolt 2.

However, such a fixed spoiler has a drawback in that it causes generation of noise at low travel speed of the vehicle. In particular, the fixed spoiler may be damaged or broken when coming into contact with an object on the ground because the ride height of the vehicle is reduced due to the fixed spoiler.

In order to prevent such drawbacks, a spoiler mounted on a vehicle to extend upwards or a spoiler mounted on a vehicle to extend rearwards has been proposed. However, such spoilers have a drawback in that it is difficult to mount the spoilers due to limits in the specifications of vehicles.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a variable spoiler device for a rear bumper of a vehicle which includes a spoiler panel performing a rear bumper function when the vehicle is in a stopped state or in a low-speed travel state while protruding from a rear bumper when the vehicle is in a high-speed travel state, to perform a spoiler function.

It is another object of the present invention to provide a variable spoiler device for a rear bumper of a vehicle which includes a spoiler panel actively varying in protrusion length in accordance with travel speed of the vehicle, thereby being capable of improving the aerodynamic performance of the vehicle to an optimum level in accordance with the travel speed of the vehicle.

It is a further object of the present invention to provide a variable spoiler device for a rear bumper of a vehicle in which retraction and protrusion of a spoiler panel is determined by a link mechanism connected to the spoiler panel, and the link mechanism continuously secures support force to enable the link mechanism to withstand wind pressure, thereby enabling the spoiler panel to be maintained in a more stable operation state.

In accordance with the present invention, the above and other objects can be accomplished by the provision of a variable spoiler device for a rear bumper of a vehicle including a drive motor fixedly mounted to a rear back beam, a spoiler panel to operate by drive power received from the drive motor via a power transmission mechanism, the spoiler panel being capable of performing a retraction operation to cause the spoiler panel to closely contact a lower surface of the rear bumper, and performing a protrusion operation to cause the spoiler panel to move downwards from the rear bumper to a protruded position, and a pair of link mechanisms to connect the spoiler panel to the power transmission mechanism so as to enable the retraction and protrusion operations of the spoiler panel.

The variable spoiler device may further include a pair of support brackets fixedly mounted to the rear back beam while supporting the link mechanisms such that the link mechanisms are pivotable through pivotal coupling thereof to the support brackets, respectively.

The variable spoiler device may further include a controller to control operation of the drive motor, and an input unit to transmit a signal associated with travel speed information to the controller.

The rear bumper may include an assembly of an upper cover and a lower cover. The lower cover may be formed with a pair of slots. The link mechanisms may be installed through the slots, respectively.

The power transmission mechanism may include a worm gear directly connected to the drive motor, a reduction gear to rotate by the worm gear, an output gear engaged with the reduction gear, and a drive shaft coupled to the output gear to be integrated with the output gear while extending through a center of the output gear such that left and right ends of the drive shaft extend in left and right directions of the rear back beam, to rotate together with corresponding ones of the link mechanisms, respectively.

Each end of the drive shaft may be connected to the corresponding link mechanism after extending through a corresponding one of the support brackets.

Each of the link mechanisms may include a drive link coupled to the corresponding end of the drive shaft, to rotate together with the drive shaft, a fixed link mounted to an inner surface of the spoiler panel, to be fixed in forward and rearward directions of the vehicle, so as to control a protrusion angle of the spoiler panel, a driven link pivotally coupled to the drive link and the fixed link at opposite ends thereof, respectively, to connect the drive link and the fixed link, so as to transmit rotation force of the drive link to the fixed link, and first and second links each pivotally coupled to the fixed link and a corresponding one of the support brackets at opposite ends thereof, respectively, to connect the fixed link and the corresponding support bracket, so as to generate support force against wind pressure when the spoiler panel protrudes.

The drive link may have a smaller length than the driven link so that the spoiler panel is not only maintained to closely contact the lower surface of the rear bumper in a retracted state, but also minimizes an operation trace of the spoiler panel when the spoiler panel protrudes from the retracted state.

The drive link and the driven link may be configured such that an intermediate portion in each of the drive link and the driven link between opposite ends in each of the drive link and the driven link forms a forwardly protruding convex shape when the spoiler panel maximally protrudes, to generate support force capable of preventing the spoiler panel from being rotated forwards by wind pressure.

The drive link and the driven link may be arranged inwards of the spoiler panel, as compared to the first and second support links under a condition that the driven link is connected to a front end of the fixed link. The first and second support links may be arranged outwards of the spoiler panel, as compared to the drive link and the driven link under a condition that the first and second support links are connected to a rear end of the fixed link. A virtual line connecting a connection center between the drive shaft and the drive link, a connection center between the driven link and the fixed link, and a connection center between the fixed link and the first support link may continuously form a triangle maintaining force equilibrium, irrespective of a protrusion length of the spoiler panel, for a stably protruded state of the spoiler panel.

The first and second support links may be arranged to continuously generate support force reverse to a direction of wind pressure, irrespective of a protrusion length of the spoiler panel.

The first and second links may be installed in parallel, for enhancement of support force.

The fixed link may be made of a material capable of absorbing impact energy, and the first and second support links may be made of a rigid material capable of securing support force against impact energy, to prevent secondary damage to the drive motor, the power transmission mechanism and the link mechanisms when the spoiler panel comes into contact with an object disposed at a rear side thereof at low speed in a protruded state.

In the variable spoiler device according to the present invention, the spoiler panel is maintained in a retracted state, in which the spoiler panel closely contacts the rear bumper, when the vehicle is in a stopped state or in a low-speed travel state and, as such, performs a rear bumper function. On the other hand, when the vehicle is in a high-speed travel state, the spoiler panel protrudes downwards from the rear bumper and, as such, performs a spoiler function. In addition, the rearward protrusion length of the spoiler panel is actively varied in accordance with travel speed of the vehicle. Thus, in the variable spoiler device of the present invention, there is an effect in that optimal aerodynamic performance is exhibited in accordance with travel speed of the vehicle.

In addition, in accordance with the present invention, retraction and protrusion of the spoiler panel is determined by the link mechanisms connected to the spoiler panel. In particular, the link mechanisms continuously secure support force to enable the link mechanisms to withstand wind pressure. Accordingly, the spoiler panel secures sufficient support force against wind pressure in a protruded state without using a separate power source and, as such, can be stably maintained in the protruded state.

In addition, in accordance with the present invention, the fixed link of each link mechanism connected to the spoiler panel is made of a material capable of absorbing impact energy, and the first and second support links of the link mechanism are made of a rigid material capable of securing support force against impact energy. Accordingly, there is an effect in that, even when the spoiler panel is damaged as the spoiler panel comes into contact with an object disposed at the rear side thereof at low speed in a protruded state, it is possible to prevent secondary damage to the drive motor, power transmission mechanism and link mechanisms.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 6 to 8 are views explaining operation states of the variable spoiler device according to the present invention, wherein FIG. 6 illustrates a retracted state of the spoiler panel, FIG. 7 illustrates a state in which the spoiler panel is protruding, and FIG. 8 illustrates a maximally protruded state of the spoiler panel.

Figure 1:
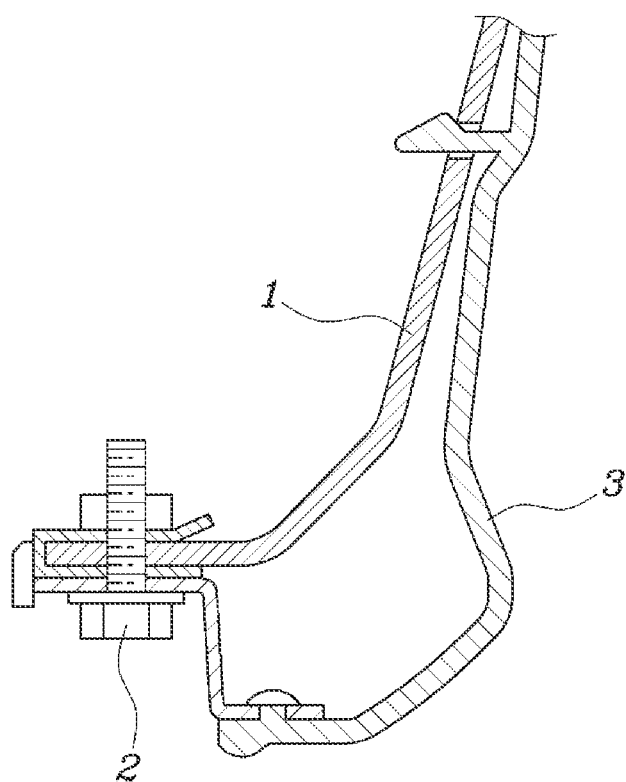
FIG. 1 is a view explaining a conventional rear bumper spoiler.
Figure 2:
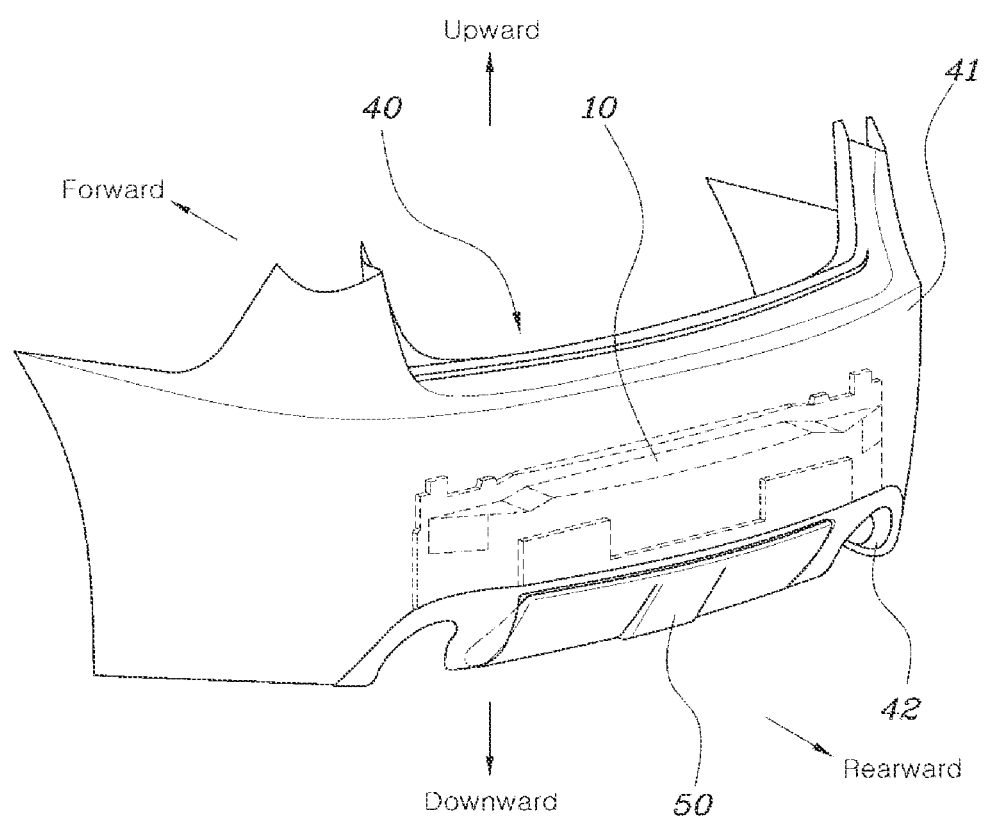
FIG. 2 is a view illustrating a retracted state of a variable spoiler device for a rear bumper according to the present invention in which a spoiler panel closely contacts the rear bumper.
Figure 3:
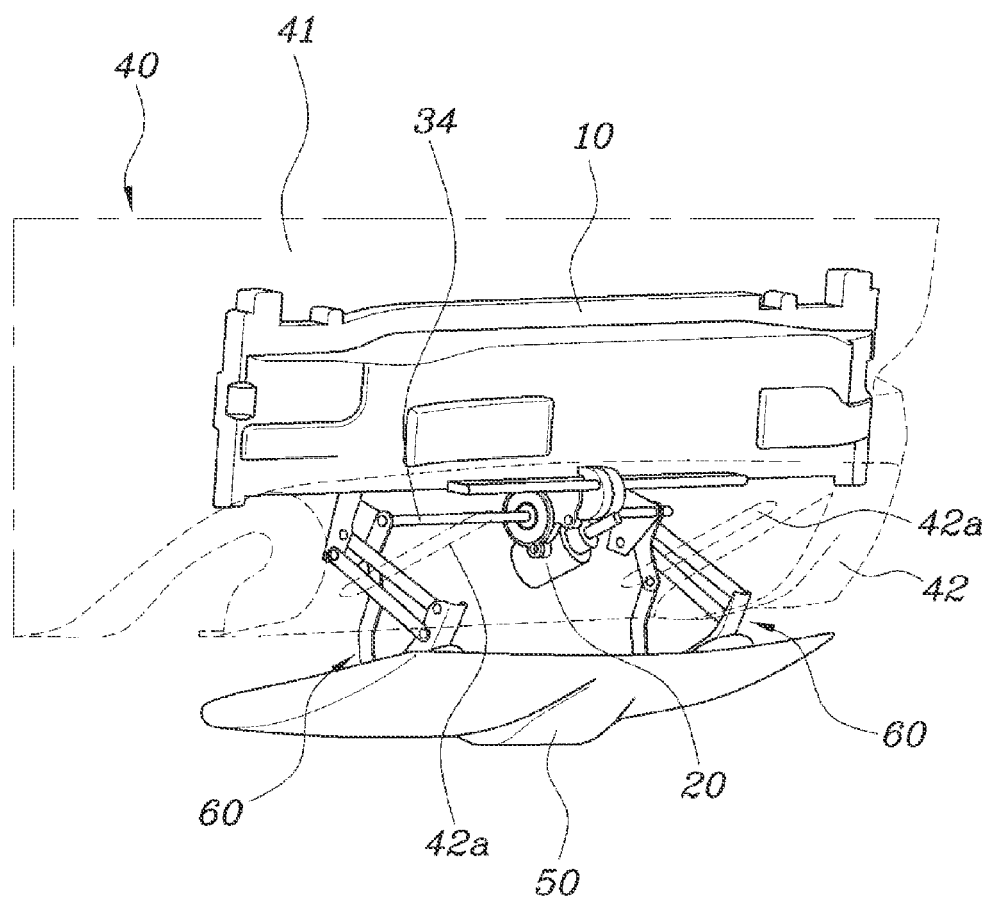
FIG. 3 is a view illustrating a protruded state of the variable spoiler device according to the present invention in which a spoiler panel protrudes downwards from the rear bumper.
Figure 4:
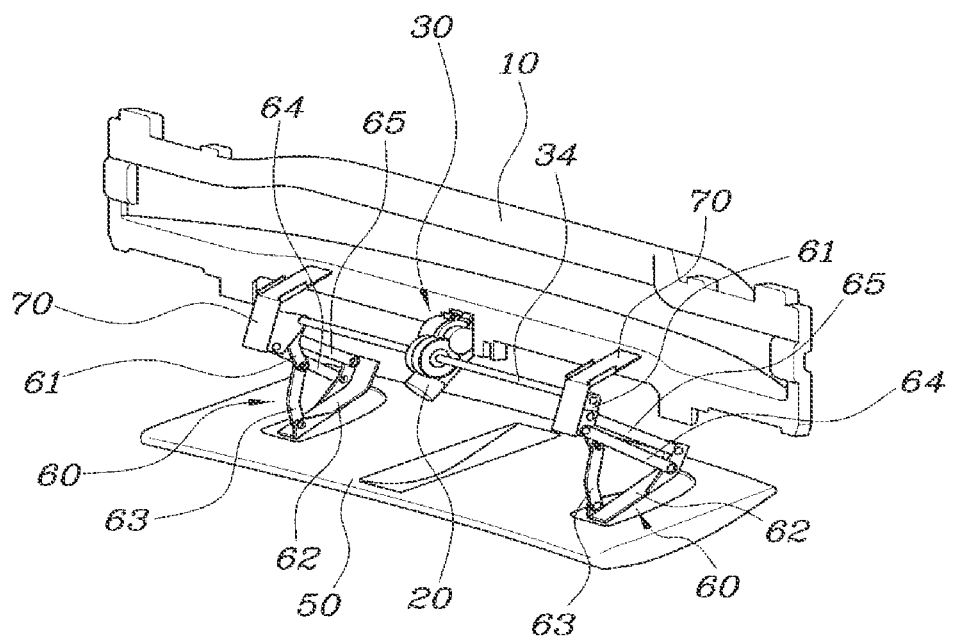
FIG. 4 is a perspective view illustrating the variable spoiler device according to the present invention.
Figure 5:
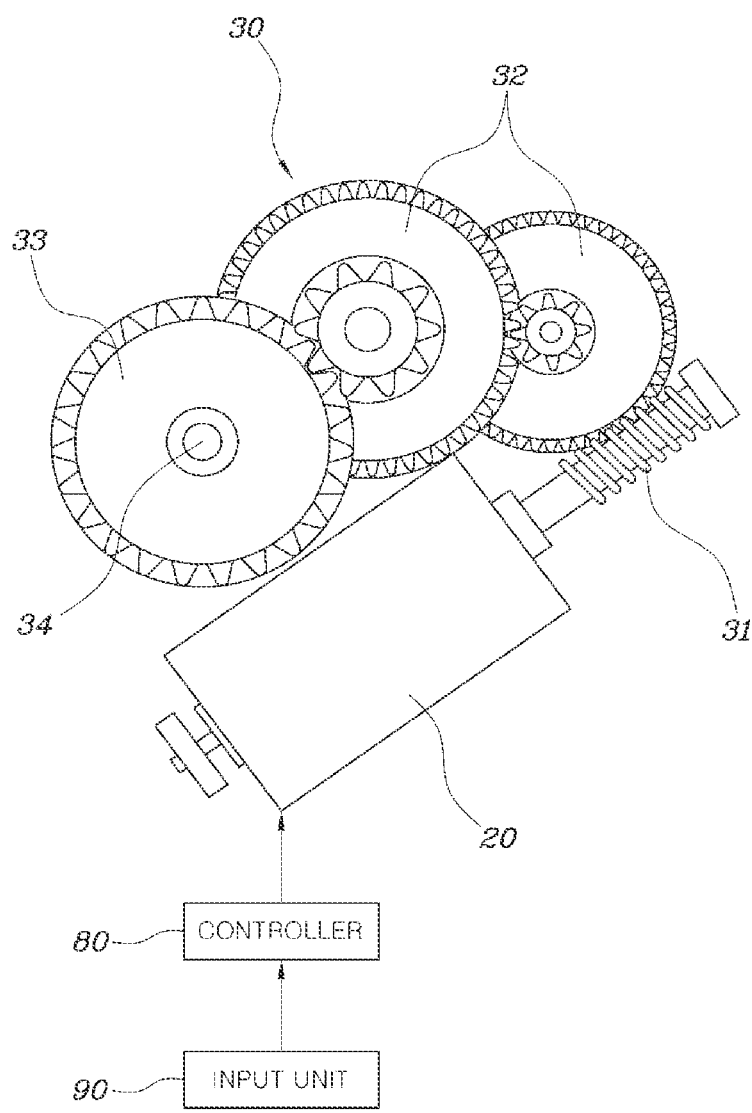
FIG. 5 is a view explaining a drive motor and a power transmission mechanism according to the present invention.
Figure 6:
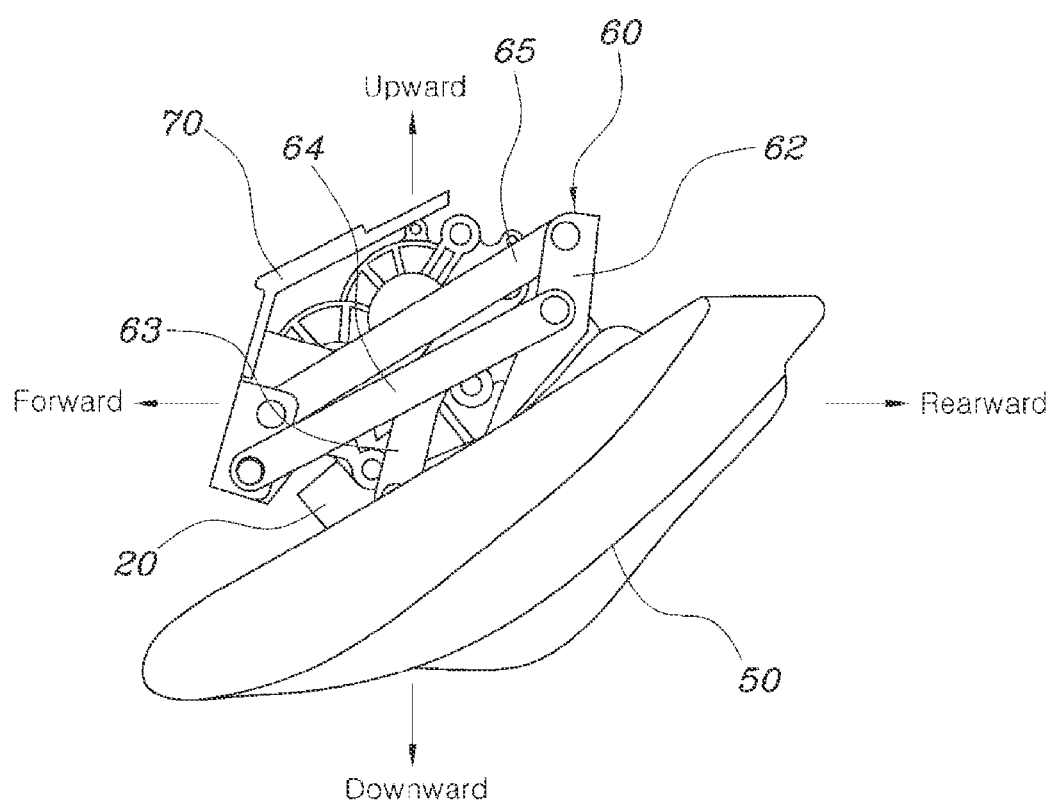
Figure 7:
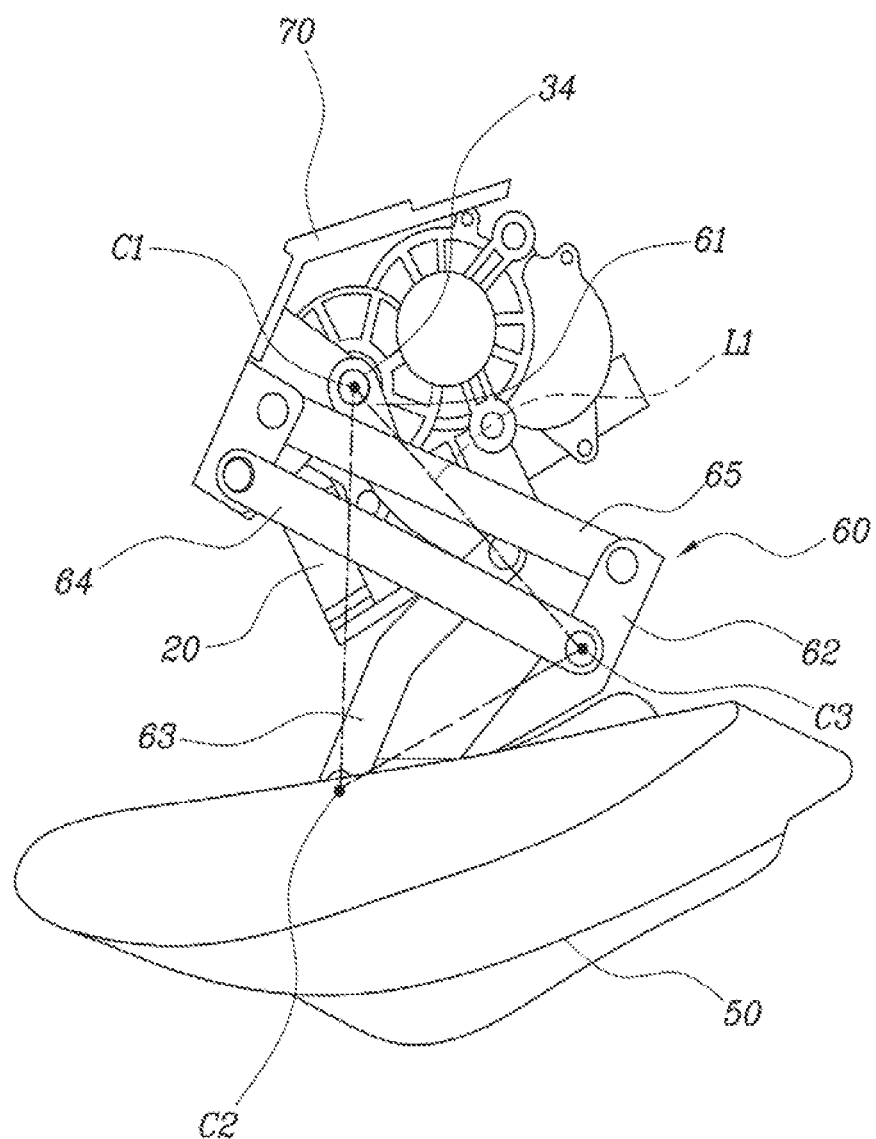

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in detail to the exemplary embodiments of the present invention associated with a variable spoiler device for a rear bumper of a vehicle, examples of which are illustrated in the accompanying drawings. Wherever possible, the same reference numbers will be used throughout the drawings to refer to the same or like parts.

Referring to FIGS. 2 to 8, a variable spoiler device for a rear bumper of a vehicle according to an embodiment of the present invention is illustrated. As illustrated in FIGS. 2 to 8, the variable spoiler device includes a drive motor 20 fixedly mounted to a rear back beam 10, and a spoiler panel 50 to operate by drive power received from the drive motor 20 via a power transmission mechanism 30. The spoiler panel 50 can perform a retraction operation to cause the spoiler panel 50 to closely contact a lower surface of the rear bumper, which is designated by reference numeral "40", and can perform a protrusion operation to cause the spoiler panel 50 to move downwards from the rear bumper 40 to a protruded position. The variable spoiler device also includes a pair of link mechanisms 60 to connect the spoiler panel 50 to the power transmission mechanism 30 so as to enable the retraction and protrusion operations of the spoiler panel 50.

The variable spoiler device further includes a pair of support brackets 70 fixedly mounted to the rear back beam 10 while supporting the link mechanisms 60 such that the link mechanisms 60 are pivotable through pivotal coupling thereof to the support brackets 70, respectively, a controller 80 to control operation of the drive motor 20, and an input unit 90 to transmit a signal associated with travel speed information to the controller 80.

The support brackets 70 are fixedly mounted to an inner surface of the rear back beam 10 (a surface directed forwards). For stable installation of the link mechanisms 60, the support brackets 70 connect the link mechanisms to the rear back beam 10. In addition, the support brackets 70 support a drive shaft, which will be described later, for stable installation of the drive shaft.

The input unit 80 may include signal input devices such as a travel speed sensor and a switch.

The rear bumper 40 includes an assembly of an upper cover 41 to cover rear and lateral sides of the vehicle while covering the rear back beam 10 and a lower cover 42 coupled to the upper cover 41, to cover a bottom side of the vehicle. A pair of slots 42a extending in forward and rearward directions is formed through the lower cover 42. The link mechanisms 60 are installed through the slots 42a, respectively.

That is, in order to enable the link mechanisms 60 to smoothly operate without interference with the rear bumper 40 during retraction and protrusion operations of the spoiler panel 50, the slots 42a are formed through the lower cover 42 of the rear bumper 40, and the link mechanisms 60 are installed through the slots 42a, respectively.

The power transmission mechanism 30 includes a worm gear 31 directly connected to the drive motor 20, at least one reduction gear 32 to rotate by the worm gear 31, an output gear 33 engaged with the reduction gear 32, and a drive shaft 34 coupled to the output gear 33 to be integrated with the output gear 33 while extending through a center of the output gear 33 such that left and right ends of the drive shaft 34 extend in left and right directions of the rear back beam 10, to rotate together with corresponding ones of the link mechanisms 60, respectively.

Each end of the drive shaft 34 is connected to the corresponding link mechanism 60 after extending through a corresponding one of the support brackets 70. In this case, the drive shaft 34 extends through the support brackets 70 such that the drive shaft 34 rotates axially. The drive shaft 34 is also supported by the support brackets 70. Thus, a structure capable of preventing bending of the drive shaft 34 while achieving stable installation of the drive shaft 34 may be provided.

The drive motor 20 is coupled to the drive shaft 34 under the condition that the drive motor 20 is disposed at a longitudinally intermediate portion of the drive shaft 34. Accordingly, drive power from the drive motor 20 is uniformly distributed to opposite ends of the drive shaft 34 and, as such, the drive shaft 34 may more stably transmit the drive power to the link mechanisms 60.

Each link mechanism 60 according to the illustrated embodiment of the present invention includes a drive link 61 coupled to the corresponding end of the drive shaft 34, to rotate together with the drive shaft 34, a fixed link 62 mounted to an inner surface of the spoiler panel 50, to be fixed in forward and rearward directions of the vehicle, so as to control a protrusion angle of the spoiler panel 50, and a driven link 63 pivotally coupled to the drive link 61 and fixed link 62 at opposite ends thereof, respectively, to connect the drive link 61 and fixed link 62, so as to transmit rotation force of the drive link 61 to the fixed link 62. The link mechanism 60 further includes first and second links 64 and 65 each pivotally coupled to the fixed link 62 and the corresponding support bracket 70 at opposite ends thereof, respectively, to connect the fixed link 62 and the corresponding support bracket 70, so as to generate support force against wind pressure when the spoiler panel 50 protrudes.

In this case, there is a feature in that the drive link 61 has a smaller length than the driven link 63. In accordance with this feature, the spoiler panel 50 can be maintained to closely contact the lower surface of the rear bumper 40 in a retracted state, and the operation trace of the spoiler panel 50 when the spoiler panel 50 protrudes from the retracted state can be minimized.

Even when the drive link 61 and driven link 63 have the same length, the spoiler panel 50 may be maintained to closely contact the lower surface of the rear bumper 40 in a retracted state. In this case, however, the operation trace of the spoiler panel 50 when the spoiler panel 50 protrudes from the retracted state is enlarged and, as such, the spoiler panel 50 may interfere with the rear bumper 40. In particular, the spoiler panel 50 may contact an object disposed at the rear side thereof and, as such, may be prevented from smoothly operating.

On the other hand, when the drive link 61 has a greater length than the driven link 63, the spoiler panel cannot be maintained to closely contact the lower surface of the rear bumper 50 in a retracted state and, as such, degradation of quality may occur. Furthermore, the operation trace of the spoiler panel 50 when the spoiler panel 50 protrudes from the retracted state is enlarged and, as such, the spoiler panel 50 may interfere with the rear bumper 40 and an object disposed at the rear side thereof.

Figure 8:
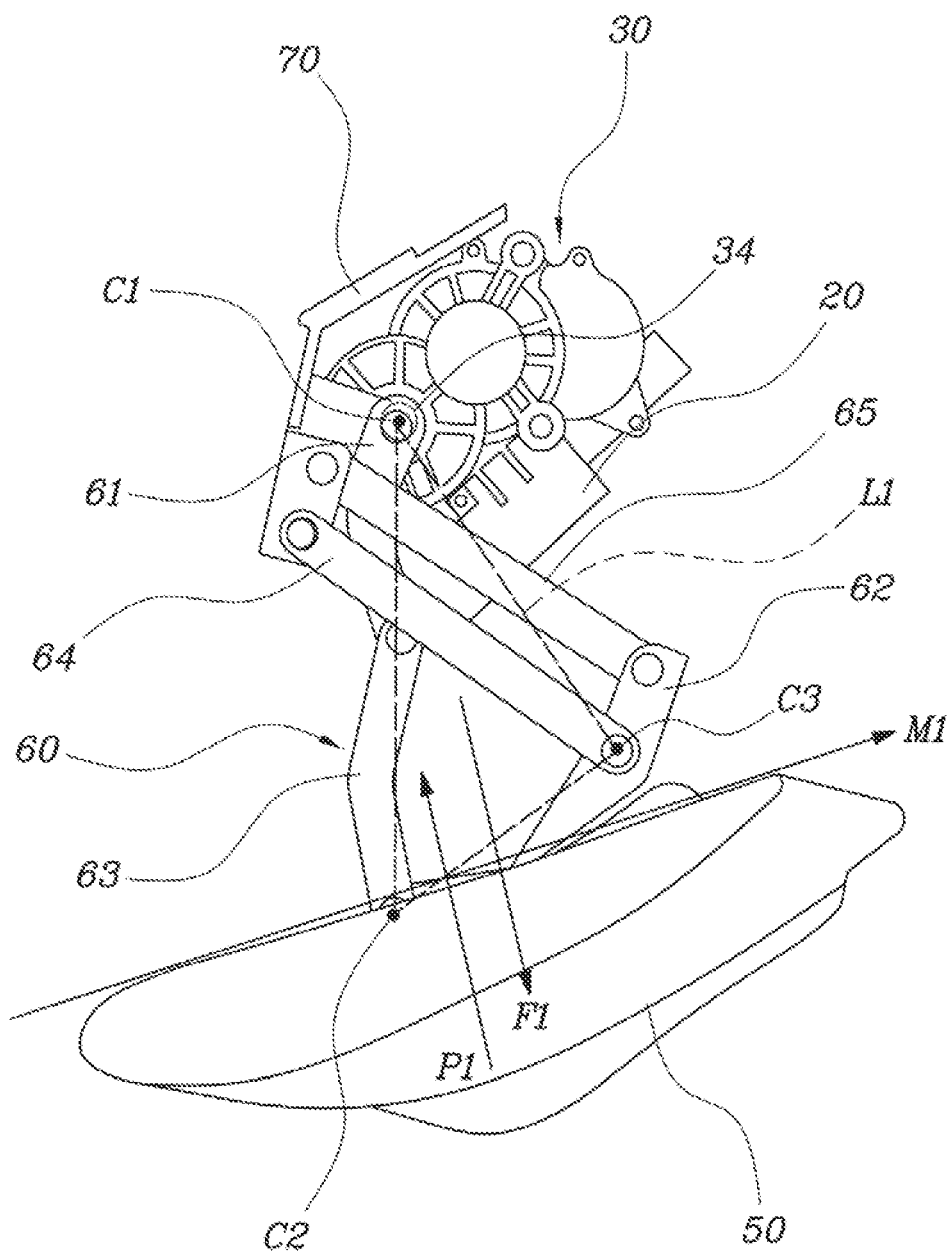

The drive link 61 and driven link 63 are configured such that an intermediate portion in each of the drive link 61 and driven link 63 between opposite ends in each of the drive link 61 and driven link 63 forms a forwardly protruding convex shape when the spoiler panel 50 maximally protrudes, as illustrated in FIG. 8. In accordance with this configuration, support force is generated by the drive link 61 and driven link 63 and, as such, it is possible to prevent the spoiler panel 50 from being rotated forwards by wind pressure.

The drive link 61 and driven link 63 are arranged inwards of the spoiler panel 50, as compared to the first and second support links 64 and 65 under the condition that the driven link 63 is connected to a front end of the fixed link 62. The first and second support links 64 and 65 are arranged outwards of the spoiler panel 50, as compared to the drive link 61 and driven link 63 under the condition that the first and second support links 64 and 65 are connected to a rear end of the fixed link 62. In accordance with this arrangement, the virtual line, which connects a connection center C1 between the drive shaft 34 and the drive link 61, a connection center C2 between the driven link 63 and the fixed link 62, and a connection center C3 between the fixed link 62 and the first support link 64, namely, a virtual line L1, continuously forms a triangle maintaining force equilibrium, irrespective of the protrusion length of the spoiler panel 50, for a stably protruded state of the spoiler panel 50. Since the spoiler panel 50 is protruded by the triangular virtual line L1 maintaining force equilibrium, as described above, the spoiler panel 50 has support force against wind pressure and, as such, the protruded state thereof is stably maintained.

The first and second support links 64 and 65 are configured and arranged to continuously generate support force F1 reverse to a direction of wind pressure P1, irrespective of the protrusion length of the spoiler panel 50.

That is, when the spoiler panel 50 is in a protruded state, as illustrated in FIG. 8, air flows rearwards along a top surface of the spoiler panel 50, as indicated by an arrow M1. In this case, air flows at a low flow rate in a region below the top surface of the spoiler panel 50 and, as such, a high pressure is generated below the top surface of the spoiler panel 50. On the other hand, air flows at a high flow rate in a region above the top surface of the spoiler panel 50 and, as such, a low pressure is generated above the top surface of the spoiler panel 50. As a result, the direction of wind pressure acting on the spoiler panel 50 corresponds to the direction from the high pressure side to the low pressure side as indicated by the arrows P1.

In this connection, in accordance with the illustrated embodiment of the present invention, the first and second support links 64 and 65 are configured and arranged to continuously generate the support force F1 reverse to a direction of wind pressure P1, irrespective of the protrusion length of the spoiler panel 50. Accordingly, the spoiler panel 50 secures sufficient support force against wind pressure in a protruded state without using a separate power source and, as such, can be stably maintained in the protruded state.

In addition, the first and second links 64 and 65 are installed in parallel and, as such, there is an advantage in that it is possible to secure further enhanced support force F1.

Meanwhile, when the spoiler panel 50 comes into contact with an object disposed at the rear side thereof at low speed in a protruded state, the spoiler panel 50 may be damaged. Even in this case, however, secondary damage to the drive motor 20, power transmission mechanism 30 and link mechanisms 60 should be prevented.

To this end, the fixed link 62 is preferably made of a material capable of absorbing impact energy, and the first and second support links 64 and 65 are preferably made of a rigid material capable of securing support force against impact energy. For example, the fixed link 62 is preferably made of a steel material partially including a plastic material in order to absorb impact energy, and the entirety of each of the first and second support links 64 and 65 is preferably made of a steel material.

In addition, in accordance with the illustrated embodiment of the present invention, the rearward protrusion length of the spoiler panel 50 is varied in accordance with travel speed of the vehicle. By virtue of this configuration, there is an advantage in that optimal aerodynamic performance is exhibited in accordance with travel speed of the vehicle.

As apparent from the above description, in accordance with the illustrated embodiment of the present invention, the spoiler panel 50 is maintained in a retracted state, in which the spoiler panel 50 closely contacts the rear bumper 40, when the vehicle is in a stopped state or in a low-speed travel state and, as such, performs a rear bumper function. On the other hand, when the vehicle is in a high-speed travel state, the spoiler panel 50 protrudes downwards from the rear bumper 40 and, as such, performs a spoiler function. In addition, the rearward protrusion length of the spoiler panel 50 is actively varied in accordance with travel speed of the vehicle. Thus, in the illustrated embodiment of the present invention, there is an advantage in that optimal aerodynamic performance is exhibited in accordance with travel speed of the vehicle.

In addition, in accordance with the illustrated embodiment of the present invention, retraction and protrusion of the spoiler panel 50 is determined by the link mechanisms 60 connected to the spoiler panel 50. In particular, the link mechanisms 60 continuously secure support force to enable the link mechanisms 60 to withstand wind pressure. Accordingly, the spoiler panel 50 secures sufficient support force against wind pressure in a protruded state without using a separate power source and, as such, can be stably maintained in the protruded state.

In addition, the fixed link 62 of each link mechanism 60 connected to the spoiler panel 50 is made of a material capable of absorbing impact energy, and the first and second support links 64 and 65 of the link mechanism 60 are made of a rigid material capable of securing support force against impact energy. Accordingly, there is an advantage in that, even when the spoiler panel 50 is damaged as the spoiler panel 50 comes into contact with an object disposed at the rear side thereof at low speed in a protruded state, it is possible to prevent secondary damage to the drive motor 20, power transmission mechanism 30 and link mechanisms 60.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable spoiler device for a rear bumper of a vehicle comprising:
   a drive motor fixedly mounted to a rear back beam;
   a spoiler panel to operate by drive power received from the drive motor via drive shaft of a power transmission mechanism, the spoiler panel performing a retraction operation to cause the spoiler panel to closely contact a lower surface of the rear bumper, and performing a protrusion operation to cause the spoiler panel to move downwards from the rear bumper to a protruded position;

a pair of link mechanisms to connect the spoiler panel to the power transmission mechanism to enable the retraction and protrusion operations of the spoiler panel; and a pair of support brackets fixedly mounted to the rear back beam while supporting the link mechanisms such that the link mechanisms are pivotable through pivotal coupling thereof to the support brackets, respectively, wherein each of the link mechanisms comprises:

a drive link coupled to the corresponding end of the drive shaft of the power transmission mechanism, to rotate together with the drive shaft;

a fixed link mounted to an inner surface of the spoiler panel, to be fixed in forward and rearward directions of the vehicle, to control a protrusion angle of the spoiler panel;

a driven link pivotally coupled to the drive link and the fixed link at opposite ends thereof, respectively, to connect the drive link and the fixed link, to transmit rotation force of the drive link to the fixed link; and first and second support links each pivotally coupled to the fixed link and a corresponding one of the support brackets at opposite ends thereof, respectively, to connect the fixed link and the corresponding support bracket, to generate support force against wind pressure when the spoiler panel protrudes.

2. The variable spoiler device according to claim 1, further comprising:

a controller to control operation of the drive motor; and an input unit to transmit a signal associated with travel speed information to the controller.

3. The variable spoiler device according to claim 1, wherein the rear bumper comprises an assembly of an upper cover and a lower cover;

the lower cover is formed with a pair of slots; and the link mechanisms are installed through the slots, respectively.

4. The variable spoiler device according to claim 1, wherein the power transmission mechanism further comprises:

a worm gear directly connected to the drive motor;

a reduction gear to rotate by the worm gear; and an output gear engaged with the reduction gear, wherein the drive shaft is coupled to the output gear to be integrated with the output gear while extending through a center of the output gear such that left and right ends of the drive shaft extend in left and right directions of the rear back beam, to rotate together with corresponding ones of the link mechanisms, respectively.

5. The variable spoiler device according to claim 4, wherein each end of the drive shaft is connected to the corresponding link mechanism after extending through a corresponding one of the support brackets.

6. The variable spoiler device according to claim 1, wherein the drive link has a smaller length than the driven link so that the spoiler panel is not only maintained to closely contact the lower surface of the rear bumper in a retracted state, but further minimizes an operation trace of the spoiler panel when the spoiler panel protrudes from the retracted state.

7. The variable spoiler device according to claim 1, wherein the drive link and the driven link are configured such that an intermediate portion in each of the drive link and the driven link between opposite ends in each of the drive link and the driven link forms a forwardly protruding convex shape when the spoiler panel maximally protrudes, to generate support force preventing the spoiler panel from being rotated forwards by wind pressure.

8. The variable spoiler device according to claim 1, wherein the drive link and the driven link are arranged inwards of the spoiler panel, as compared to the first and second support links under a condition that the driven link is connected to a front end of the fixed link;

the first and second support links are arranged outwards of the spoiler panel, as compared to the drive link and the driven link under a condition that the first and second support links are connected to a rear end of the fixed link; and a virtual line connecting a connection center between the drive shaft and the drive link, a connection center between the driven link and the fixed link, and a connection center between the fixed link and the first support link continuously forms a triangle maintaining force equilibrium, irrespective of a protrusion length of the spoiler panel, for a stably protruded state of the spoiler panel.

9. The variable spoiler device according to claim 1, wherein the first and second support links are arranged to continuously generate support force reverse to a direction of wind pressure, irrespective of a protrusion length of the spoiler panel.

10. The variable spoiler device according to claim 1, wherein the first and second support links are installed in parallel, for enhancement of support force.

11. The variable spoiler device according to claim 1, wherein the fixed link is made of a material absorbing impact energy, and the first and second support links are made of a rigid material securing support force against impact energy, to prevent secondary damage to the drive motor, the power transmission mechanism and the link mechanisms when the spoiler panel comes into contact with an object disposed at a rear side thereof at low speed in a protruded state.

* * * * *